United States Patent
Lindsay et al.

(10) Patent No.: US 7,959,228 B2
(45) Date of Patent: Jun. 14, 2011

(54) METHOD FOR LOADING A CHILD OR CHILD SEAT INTO A VEHICLE

(75) Inventors: Derek Lindsay, Marysville, OH (US);
Rudy Mayne, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 76 days.

(21) Appl. No.: 12/190,677

(22) Filed: Aug. 13, 2008

(65) Prior Publication Data
US 2010/0038945 A1   Feb. 18, 2010

(51) Int. Cl.
*A47C 1/08* (2006.01)
(52) U.S. Cl. .................................... 297/250.1
(58) Field of Classification Search ............. 297/250.1, 297/216.15, 216.16, 216.19, 340, 341, 342, 297/343
See application file for complete search history.

(56) References Cited

U.S. PATENT DOCUMENTS

| | | | | |
|---|---|---|---|---|
| 2,387,186 A * | 10/1945 | Schofield | ...................... | 296/19 |
| 2,584,481 A * | 2/1952 | Mast | .............................. | 297/115 |
| 2,848,273 A * | 8/1958 | Diaz | .......................... | 296/65.09 |
| 3,169,792 A * | 2/1965 | Solano Viquez | ............. | 296/99.1 |
| 3,188,133 A * | 6/1965 | Tewksbury | ...................... | 296/64 |
| 3,227,488 A * | 1/1966 | Kosbab et al. | ................ | 297/330 |
| 3,488,086 A * | 1/1970 | Himka et al. | ............... | 296/65.06 |
| 4,671,563 A * | 6/1987 | Shakespear | ................. | 296/181.1 |
| 5,269,581 A | 12/1993 | Odagaki et al. | | |
| 6,085,384 A | 7/2000 | Bivens | | |
| 6,095,604 A | 8/2000 | Stack et al. | | |
| 6,371,556 B1 * | 4/2002 | Arai | ............................... | 297/331 |
| 6,485,102 B1 | 11/2002 | Moffa et al. | | |
| 6,609,745 B2 * | 8/2003 | Miyahara et al. | ........... | 296/65.11 |
| 6,820,913 B2 | 11/2004 | Macey et al. | | |
| 6,837,530 B2 | 1/2005 | Rudberg et al. | | |
| 7,156,442 B2 * | 1/2007 | McManus et al. | .......... | 296/65.09 |
| 7,182,191 B2 | 2/2007 | Scott et al. | | |
| 2002/0153740 A1 | 10/2002 | Miyahara et al. | | |
| 2008/0211279 A1 * | 9/2008 | Pesach | ...................... | 297/256.12 |

FOREIGN PATENT DOCUMENTS

JP           61009351 A  *  1/1986

* cited by examiner

*Primary Examiner* — David Dunn
*Assistant Examiner* — David E Allred
(74) *Attorney, Agent, or Firm* — Mark E. Doell, Esq.; Emerson Thomson Bennett

(57) ABSTRACT

A method of loading a child or child seat into a vehicle is disclosed. A user can rotate the rear-most vehicle seat toward the rear of the vehicle and load the child and/or child seat from the rear opening.

20 Claims, 2 Drawing Sheets

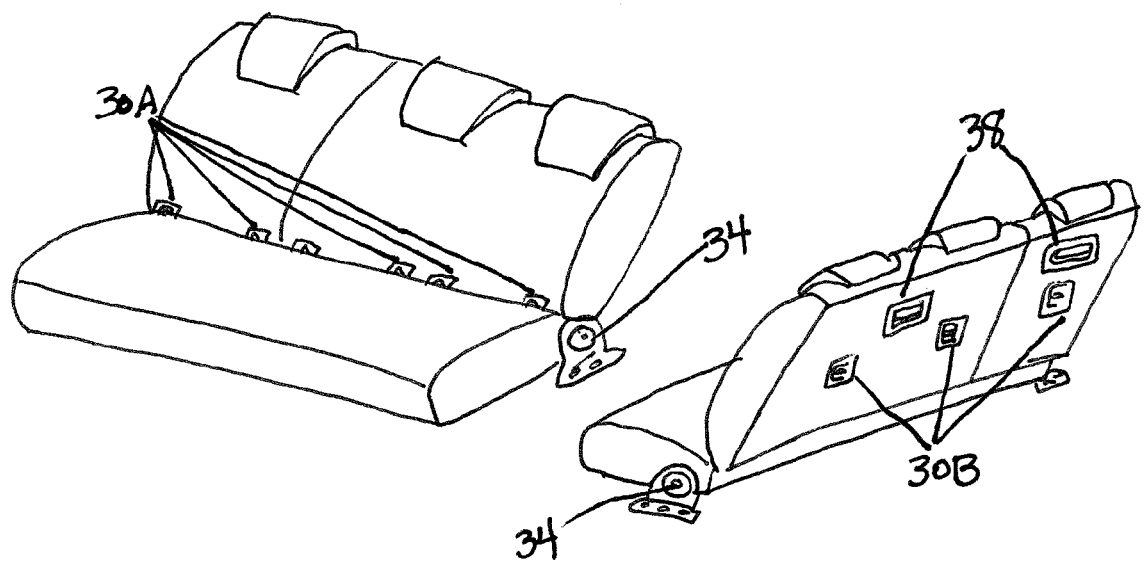

METHOD FOR LOADING A CHILD OR CHILD SEAT INTO A VEHICLE

I. BACKGROUND OF THE INVENTION

A. Field of Invention

This invention pertains to the art of methods and apparatuses regarding vehicle seat relocation and the loading of people and cargo, and more particularly to methods and apparatuses regarding the simplification of loading and unloading of an infant or child (or related child seat) into a vehicle.

B. Description of the Related Art

It is well known to use vehicles to carry or transport both cargo and human passengers. It is also well known to provide vehicles with seat assemblies that are secured to the vehicle frame within a passenger compartment. Each seat assembly includes one or more seat areas that receive passengers. Typically, each seat area is equipped with passenger restraints that are used to protect a passenger during a vehicle collision. These passenger restraints generally include one or more straps or belts referred to as "seat belts." In cases where the passenger is small, such as a small child or a baby, it is well known to provide an additional device typically referred to as a "car seat," "baby seat," or "child seat," which receives and protect the small passenger. Such child seats are generally secured to the seat assembly using the corresponding seat belts.

Typically a seat assembly for an automotive vehicle includes a generally upright seatback fixedly or movably connected to a generally horizontal seatbase for use in supporting an occupant in the seat assembly. The seatbase may be fixedly or movably connected to the vehicle frame. The seatbase may be movable, for example, to permit adjustment for userheight. The seatbase and/or seatback may also be movable into a position where the seat assembly, or a portion thereof, may be stored.

Additionally, it is well known in the art for vehicle seats to be adjustable in numerous ways. The seatback may, for example, recline to a near horizontal angle while the seatbase remains stationary. In another known example, the entire seat assembly may be raised and lowered. It is also known to provide a seat assembly mounted to rails that enable the front-facing seat assembly to slide in a forward and reverse direction while facing the same direction. In another known example, vehicle seats may rotate about a horizontal axis whereby the front-facing seat can rotate so that it faces the rear of the vehicle. In yet another known example, vehicle seats may rotate on a horizontal axis from front-facing to rear-facing seats wherein the entire seat assembly rotates and the seatback becomes the seatbase and the former seatback becomes the seatback. It is also known to provide seat assemblies that may be placed into a storage cavity. An example of such a seat assembly is disclosed in U.S. Pat. No. 5,269,581 issued Dec. 14, 1993 to Odagaki et al.

When child seats are used, it is known to secure the child seat using a number of receptacles, which are recess mounted into the rearwardly facing surface of the vehicle seatback for fastening the top portion of a child seat. It is also known to use fasteners at the base of frontwardly facing surface of the vehicle seatback to tether the lower portion of the child seat so that the child seat can be securely fastened to the vehicle and vehicle seat. An example of such a fastening system is disclosed in U.S. Pat. No. 6,095,604 to Stack et al.

While such known designs generally work well for their intended purpose, they do not fully solve the problems encountered by parents and/or guardians when loading (or unloading) a child into (or out of) a vehicle. More specifically, it is generally difficult to access a child for loading and unloading purposes regardless of whether a child seat is used or not. Typically, a user must climb into the passenger compartment of the vehicle (with the child in their arms) in order to properly load and fasten the child into the vehicle seat or child seat. This procedure is time consuming and physically difficult for the user, as it must be repeated each and every time the child enters and exits the vehicle. An easier and faster method is needed to load and unload a child into and out of a vehicle.

II. SUMMARY OF THE INVENTION

According to one embodiment of the invention, a method includes the steps of: providing a frame, an engine, at least one ground engaging wheel, a rear opening, and a front-facing seat assembly comprising a seatbase and a seatback, moving the front-facing seat assembly via the rear opening by moving both the seatbase and seatback from a use position to a angled loading position, placing a child seat on the seat assembly via the rear opening at the angled loading position, connecting the child seat to the vehicle seat assembly via the rear opening at the angled loading position wherein the child seat is properly positioned to restrain a child, moving the vehicle seat via the rear opening from the angled loading position to the use position.

According to another embodiment of the invention, the seat may be returned to the use position after loading the child seat and prior to the vehicle being in motion.

According to another embodiment of the invention, after the child seat is placed in the vehicle seat at the angled loading position, a child can then be inserted into the child seat and easily secured in the safety restraints.

In yet another embodiment, a damper may be used to control the rate of descent and ascent of the front-facing seat assembly as the seat assembly transfers from the angled loading position to the use angle and vice versa.

One advantage of this invention is that it simplifies the process of loading a child seat into a vehicle and also simplifies the process of loading a child into the child seat in the vehicle.

Another advantage of this invention is that it permits the loading of a child or child seat into the vehicle from the rearward exterior of the vehicle. Thus, a user can open the rear hatch or door of vehicle, stand outside the vehicle, and remove the child or child seat from the vehicle without having to enter the passenger seating area. The user may thereby avoid any uncomfortable contortion that is associated with removing a young child from a child seat.

Another advantage of this invention is that it enables a user to more easily load and unload a physically disabled person.

Still other benefits and advantages will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 3A is a front perspective view of one embodiment of the seat assembly in the upright use position depicting an ascent/descent device and safety latches.

FIG. 3B is a back perspective view of the seat assembly shown in FIG. 3A depicting the ascent/descent device and assent/descent device release latches.

IV. DETAILED DESCRIPTION OF THE INVENTION

Figure 1:
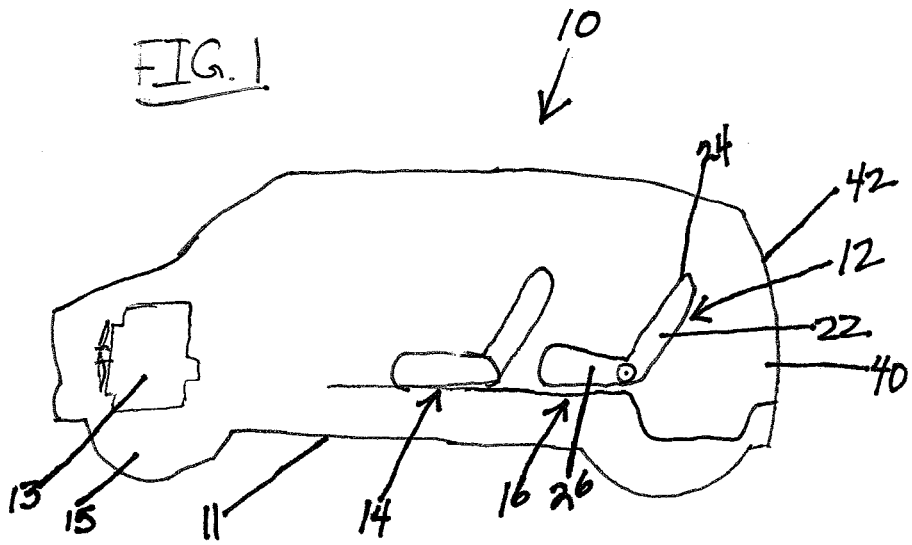
FIG. 1 is a schematic side view of a vehicle with a seat assembly shown in an upright, use position.

Referring now to the drawings wherein the showings are for purposes of illustrating embodiments of the invention only and not for purposes of limiting the same, and wherein like reference numerals are understood to refer to like components, FIG. 1 shows a vehicle 10 equipped with a seat assembly 12 according to one embodiment of this invention. The vehicle 10 is equipped with a frame 11, a engine 13, seating for several occupants, a suspension and at least one wheel 15 that is in contact with the ground. The engine 13 is used to provide locomotion for the vehicle 10 in any known manner. The vehicle 10 also has a rear opening 40 which is selectively opened and closed by a hinged trunk hatch 42. While the vehicle 10 shown is commonly known as a minivan, it is to be understood that this invention will work with any type of vehicle equipped with a seat assembly and rear opening, including, for some non-limiting examples, full-size vans, sport utility vehicles, station wagons, and cross-over vehicles. Applicant does not limit the term "vehicle" to include only the types stated above, as the invention is applicable to all passenger vehicle types. Furthermore, the term "engine" can include, but not exclusive to, internal combustion engines, hybrid electric motor/internal combustion engines, electric/battery powered propulsion systems, hydrogen propulsion systems, and air propulsion systems.

Figure 2A:
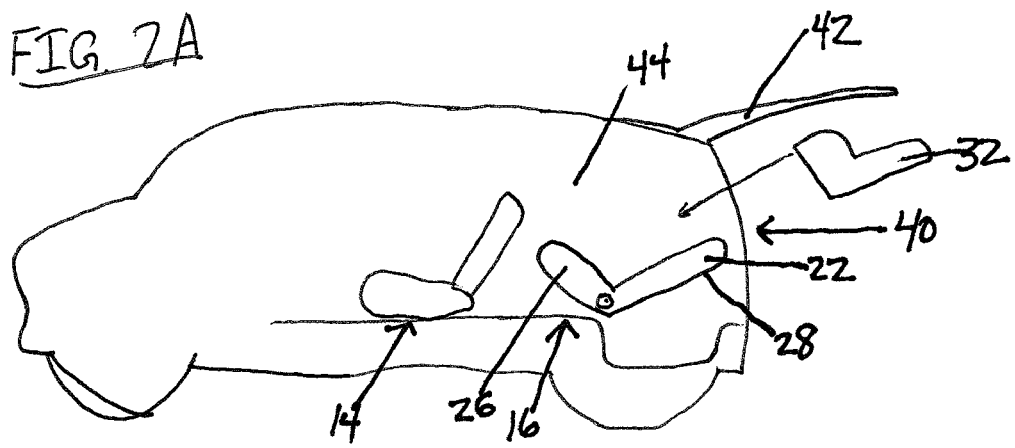
FIG. 2A is a schematic side view of a vehicle similar to that shown in FIG. 1 but showing the seat assembly in an angled loading position with a child seat being loaded into the seat assembly.
Figure 2B:
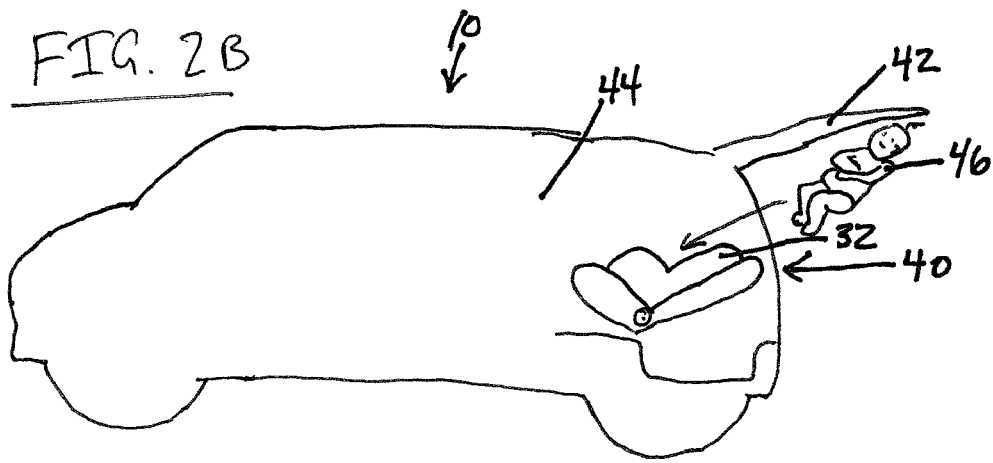
FIG. 2B is a schematic side view of a vehicle similar to that shown in FIG. 2 but showing a child being loaded into the seat assembly/child seat combination.

As illustrated in FIGS. 1, 2A, and 2B, the vehicle 10 consists of two rear row bench seats 14 and 16 with the driver and front passenger having their own individual seats. An alternative arrangement can include the first row rear seat having two individual seats and the rear row having a bench seat for three occupants (not shown). Additionally, some mini-vans substitute the rear bench-seat 16 in favor of two rows of two individual seats for a total of four rear seats resembling a two-by-two configuration. The mini-van's seating arrangement can vary depending on the needs of the owner and the manufacturer of the vehicle. It is important to note that this invention is not solely limited to a single type of seating arrangement. This invention is applicable to the varying seating arrangements and can be successfully implemented with individual seats as well as bench-seats.

With continuing reference to FIGS. 1, 2A, and 2B, as noted above it is known to provide vehicle seats that permit multiple degrees of freedom in how they are positioned within the vehicle. Often seats, both front and rear, are capable of numerous aspects of position customization to satisfy the comfort level of the occupant. For some examples, some vehicles allow the seat occupant to adjust the headrest in a vertical direction; sometimes the seatback portion 22 is capable of reclining in a rearward direction; and, sometimes the entire seat assembly 12 is capable of moving in a vertical and horizontal direction. It is also well known that the driver and front passenger have greater degrees of freedom with their seats than the rear passengers occupying a bench seat. Generally mini-van bench seats do not have as much freedom to move as their front seat counterparts.

With continuing reference to FIGS. 1, 2A, and 2B, the rear seat assembly 12 is capable of reclining in a rearward direction. The reclining motion is different from that known in the art. Usually, the seatback portion 22 reclines from an upright use position 24, as illustrated in FIG. 1, while the seatbase portion 26 remains stationary. This movement effectively increases the angle between the seatback portion 22 and the seatbase portion 26 from what was a substantially 90° angle between the seatback portion 22 and seatbase portion 26 to something that is substantially between 90° and 180° between the seatback portion 22 and seatbase portion 26. In one embodiment of this invention, however, there is no change in the angle between the seatback portion 22 and seatbase portion 26 as the seat assembly 12 is adjusted between the upright use position and the angle loading position. This constant angle between the seatback portion 22 and seatbase portion 26 provides advantages and improvement over the known art, as described below.

Again referencing FIGS. 1, 2A, and 2B, commonly, with mini-vans and many other classes of passenger vehicles, it is advantageous to have direct rear access to the passenger compartment of the vehicle. Within this disclosure, the term "rear-opening" is defined to include any opening formed in a rear surface of the vehicle that permits access into the passenger compartment 44. For one non-limiting example, in a mini-van the rear opening 40 may be the opening revealed by the movement of the trunk hatch 42, which can be raised to give direct access to the vehicle's passenger compartment 44 and rear seats. Rear-opening does not include any opening providing access to a vehicle's passenger compartment by means of a side door.

The term "child seat" is to be understood as any safety device used to secure an infant or young child onto a vehicle seat. The term child seat thus includes devices known as infant carriage seats and devices known as booster seats for pre-school age children. It is also important to note that the term "child" does not limit the occupant to a certain age or age range or size. A child 46 could be a newborn up to an adolescent or adult. Furthermore, this term includes those of any disability or handicap that limits mobility or requires assistance when entering a vehicle. In disclosing the method of inserting a child or child seat into a vehicle 10 via the rear-opening, the term "child seat" 32 will be used throughout. However, it should be noted that a this method can be performed using only a child 46, or using only a child seat 32, or it could also be performed by putting the child 46 into the child seat 32 outside of the vehicle 10 prior to undertaking the disclosed method. Alternatively, a child 46 could perform the same steps and enter the vehicle 10 under his/her own power. Additionally, while the disclosed method only teaches the securing of a child 46 and/or child seat 32 into a vehicle, this process is also capable of being performed in the reverse order. That is, the child 46 and/or child seat 32 can be removed via the rear opening 40 of the vehicle 10 using the same steps disclosed, but in a reversed order.

Now referencing FIGS. 3A, and 3B, the rear seat assembly 12 includes one or more safety seat latches 30A and 30B as shown in FIGS. 3A and 3B. The latches 30A and 30B can be used by the vehicle operator to assist in fastening a child seat 32 into the vehicle seat assembly 12. For the embodiment shown, there are two sets of safety seat latches within the rear seat assembly 12. The first set of latches 30A are located where the seatbase portion 26 meet the seatback portion 22. The first set of latches 30A enable an owner to secure the base of a child seat 32 to the seatbase portion 26 of the seat assembly 12. The second set of latches 30B, located on the rear of the seatback portion 22, enable the back support of the child seat 32 to be securely fastened to the seatback portion 22 of the seat assembly 12. Additional safety devices can be used in substitution of the latches 30A and 30B, such as hooks, levers, mechanically-biased holders, etc. It is within the scope of this invention to substitute many different devices selected with the skill of a person of ordinary skill in the art to safely fasten the child seat 32 to the seat assembly 12.

In another embodiment, shown in FIGS. 3A and 3B, the seat assembly 12 may include an ascent/descent device 34. During the reclining and inclining motions, the ascent/descent device 34 controls the rate of descent and ascent of the seat assembly 12. This feature prevents any accidental or uncontrolled descent or ascent that may occur. Additionally, it prevents any greater-than-necessary force from being applied to raise the seat assembly 12 from its angled loading position 28 back into its use position 24. The ascent/descent device 34 should be interpreted to include any device that is able to control the descent and ascent of the seat assembly 12 and does not limit itself to that which is depicted in FIGS. 3A and 3B. As a non-limiting example, the ascent/decent device 34 may be a gas strut or a clock spring at the pivot point. Additionally, the location of the ascent/descent device 34 is flexible and can be at the base of the seating assembly 12, built-in to the seat assembly 12, or hidden from view to prevent tampering. Furthermore, in one embodiment the ascent/descent device 34 is made up of mechanical means, but in another embodiment can either be driven by user-supplied-force or can be propelled and controlled by an electronic motor.

With reference now to FIGS. 3A and 3B and in yet another embodiment, the ascent/descent device is a release 38. The ascent/descent device release 38 controls the operation of the seat assembly 12. When the seat assembly 12 is in the use position 24, the ascent/descent device release 38 can be activated to begin the transfer from use position 24 to angled loading position 28 in a controlled manner, regardless of the amount of force exerted on the seat assembly 12 during descent. Additionally, if the seat assembly 12 is in the angled loading position 28, the ascent/descent device release 38 can be activated to begin the transfer from angled loading position 28 to the use position 24 in a controlled manner. The location of the ascent/descent device 34 can be on the rear of the seatback portion 22, or recessed within the vehicle floor, or any other location that is easily accessible from the rear of the vehicle.

Again referring to FIG. 1, in use the user first makes the rear-opening 40 accessible (if it is not already accessible) such as by opening the rear hatch 42. The user then depresses or activate the ascent/descent device release 38 (if it is used), illustrated in FIG. 3B. This would allow the seat assembly 12 to begin it's descent toward the user at the rear of the vehicle 10. Additionally, this is the point at which the ascent/descent device 34 would control the rate of descent toward the user at the rear of the vehicle 10. The ascent/descent device 34 prevents any accidental contact between the seat assembly 12 and the user. A specific maximum angle of decent may be allowed by the manufacturer, but in an alternative embodiment, an adjustable angle may be implemented by using recliner adjustments.

Now referring to FIG. 2A, once the seat assembly 12 has descended to a favorable angle chosen by the user, it is then possible to insert a child seat 32 into the seat assembly 12 at the angled loading position 28. Once the child seat 32 is resting on the seat assembly 12 in the angled loading position, the user is then able to fasten the child seat 32 using the two set of latches 30A and 30B (if they are used—the first may be located where the seatbase portion 26 meets the seatback portion 22, and the second set may be located on the rear of the seatback portion 22). The safety latches 30A and 30B permit the child seat to be securely fastened to the seat assembly 12 and, in the case of an accident, protect the child from injury by preventing any dangerous movement by the child seat 32.

As illustrated in FIG. 2B, once the child seat 32 has be securely fastened to the seat assembly 12 in the angled loading position 28, it is then possible to fasten a child 46 into the child seat 32. As noted previously, and depending on the age and ability of the child 46, it is also possible to forgo the loading of the child seat 32 and load the child 46 directly into the seat assembly 12 at the angled loading position 28.

As shown in FIGS. 3A and 3B, once the child seat 32 or child 46 has been securely fastened into the seat assembly 12 at the angled loading position 28, the user then presses the ascent/descent device release 38 to begin the controlled ascent to the use position 24. As disclosed above, this is the point at which the ascent/descent device 34 would control the rate of ascent toward the front of the vehicle 10. The ascent/descent device 34 prevents any accidental application of force or acceleration of the seat assembly 12 while moving the seat assembly 12 to the use position 24.

The final step in the method after the seat assembly 12 has been returned to its use position 24 would be to close the trunk hatch 42 of the vehicle 10, as illustrated in FIG. 1.

Numerous embodiments have been described, hereinabove. It will be apparent to those skilled in the art that the above methods and apparatuses may incorporate changes and modification without departing from the general scope of this invention. It is intended to include all such modification and alterations in so far as they come within the scope of the appended claims or the equivalents thereof.

What is claimed is:

1. A method comprising the steps of:
    (a) providing a vehicle with a frame, an engine, at least one ground engaging wheel a passenger compartment, a front-facing seat assembly comprising a seatbase and a seatback in the passenger compartment, and a hatch pivotally connected with the passenger compartment for rotation in a first direction about a first axis to form a rear opening located substantially behind the front-facing seat assembly in the passenger compartment;
    (b) moving the front-facing seat assembly via the rear opening by pivoting both the seatbase and seatback in a second direction opposite the first direction about a second from a use position to an angled loading, wherein moving the front-facing seat assembly to the angled loading position comprises moving the front-facing seat assembly to one of a specific maximum angle and an adjustable angle in which the front-facing seat assembly is at least partially upright and facing forward position;
    (c) placing a child seat in a forward facing orientation on the front-facing seat assembly via the rear opening at the angled loading position;
    (d) connecting the child seat to the front-facing seat assembly via the rear opening at the angled loading position wherein the child seat is properly positioned to restrain a child in the forward facing orientation; and,
    (e) moving the front-facing seat assembly via the rear opening from the angled loading position to the use position.

2. The method of claim 1 wherein prior to step (e) the method further comprises the step of:
    placing a child into the child seat in the forward facing orientation.

3. The method of claim 1 wherein:
prior to step (e) the method comprises the steps of: providing a damper; and
step (e) comprises the step of damping the rate of descent of the front-facing seat assembly.

4. The method of claim 1 wherein prior to step (b) the method comprises the step of:
accessing the front-facing seat assembly via a rear hatch of the vehicle.

5. The method of claim 1 wherein prior to step (e) the method comprises the steps of:
(f) moving the front-facing seat assembly from the upright position to the angled loading position via the rear opening;
(g) disconnecting the child seat from the front-facing seat assembly at the angled loading position via the rear opening;
(h) removing the child seat from the front-facing seat assembly at the angled loading position via the rear opening; and,
(i) moving the front-facing seat assembly from the angled loading position to the upright position via the rear opening.

6. The method of claim 1 wherein step (b) comprises the step of:
moving the front-facing seat assembly with an automated, motor-driven device.

7. The method of claim 1 wherein step (b) comprises the step of:
moving the angled loading position of the front-facing seat assembly to a predetermined angle.

8. The method of claim 1 wherein step (a) comprises the step of:
providing an ascent/descent device located at the base of the front-facing seat assembly, wherein the ascent/descent device controls the rate of ascent and descent of the front-facing seat assembly as the seat assembly moves between the use position and the angled loading position.

9. The method of claim 8 wherein the ascent/descent device is selected from the group consisting of a gas strut and a clock spring.

10. The method of claim 1 wherein prior to step (b) the method further comprises the step of:
activating a release mechanism located in the rear surface of the seatback.

11. The method of claim 1 wherein after step (d) and prior to step (e) the method further comprises the step of:
activating a release mechanism located in the rear surface of the seatback.

12. A method comprising the steps of:
(a) providing a vehicle with a frame, an engine, at least one ground engaging wheel a passenger compartment, a front-facing seat assembly comprising a seatbase and a seatback in the passenger compartment, and a hatch pivotally connected with the passenger compartment for rotation in a first direction about a first axis to form a rear opening located substantially behind the front-facing seat assembly in the passenger compartment;
(b) moving the front-facing seat assembly via the rear opening by pivoting both the seatbase and seatback in a second direction opposite the first direction about a second axis from a use position to an angled loading position, wherein moving the front-facing seat assembly to the angled loading position comprises moving the front-facing seat assembly to one of a specific maximum angle and an adjustable angle in which the front-facing seat assembly is at least partially upright and facing forward;
(c) placing a child in a forward facing orientation on the front-facing seat assembly via the rear opening at the angled loading position;
(d) securing the child to the front-facing seat assembly via the rear opening at the angled loading position where the child is properly positioned to be restrained in the forward facing orientation; and,
(e) moving the front-facing seat assembly via the rear opening from the angled loading position to the use position.

13. The method of claim 12 wherein:
prior to step (e) the method comprises the steps of: providing a damper; and
step (e) comprises the step of damping the rate of descent of the front-facing seat assembly.

14. The method of claim 12 wherein prior to step (b) the method comprises the step of:
accessing the front-facing seat assembly via a rear hatch.

15. The method of claim 12 wherein prior to step (e), the method comprises the steps of:
(f) moving the front-facing seat assembly from the upright position to the angled loading position;
(g) unfastening the child from the front-facing seat assembly at the angled loading position;
(h) removing the child from the front-facing seat assembly at the angled loading position; and,
(i) moving the front-facing seat assembly from the angled loading position to the upright position.

16. The method of claim 12 wherein step (b) comprises the step of:
moving the front-facing seat assembly with an automated, motor-driven device.

17. The method of claim 12 wherein step (b) comprises the step of:
moving the angled loading position of the front-facing seat assembly to a predetermined angle.

18. The method of claim 12 wherein step (a) comprises the step of:
providing an ascent/descent device located at the base of the front-facing seat assembly, wherein the ascent/descent device controls the rate of ascent and descent of the front-facing seat assembly as the seat assembly moves between the use position and the angled loading position.

19. The method of claim 12 wherein prior to step (b) the method further comprises the step of:
activating a release mechanism located in a rear surface of the seatback.

20. The method of claim 12 wherein after step (d) and prior to step (e) the method further comprises the step of:
activating a release mechanism located in the rear surface of the seatback.

* * * * *